Sept. 15, 1925.

I. T. SLIFKIN

DISPLAY DEVICE

Filed Feb. 24, 1925

INVENTOR
Irving T. Slifkin
BY J. T. Basseches
his ATTORNEY

Sept. 15, 1925.                                             1,554,137
                        I. T. SLIFKIN
                       DISPLAY DEVICE
                    Filed Feb. 24, 1925        4 Sheets-Sheet 2

INVENTOR
Irving T. Slifkin
BY J. P. Baseeches
his ATTORNEY

Sept. 15, 1925.

I. T. SLIFKIN

DISPLAY DEVICE

Filed Feb. 24, 1925

INVENTOR
Irving T. Slifkin
BY
J. T. Basseches
his ATTORNEY

Sept. 15, 1925.                I. T. SLIFKIN                1,554,137
                              DISPLAY DEVICE
                          Filed Feb. 24, 1925        4 Sheets-Sheet 4

INVENTOR
Irving T. Slifkin
BY
his ATTORNEY

Patented Sept. 15, 1925.

1,554,137

UNITED STATES PATENT OFFICE.

IRVING T. SLIFKIN, OF NEW YORK, N. Y., ASSIGNOR TO MATTHEW M. FRIEDMANN, OF NEW YORK, N. Y.

DISPLAY DEVICE.

Application filed February 24, 1925. Serial No. 10,991.

*To all whom it may concern:*

Be it known that I, IRVING T. SLIFKIN, a citizen of the United States, residing in the city, county, and State of New York, have invented new and useful Improvements in a Display Device, of which the following is a specification.

This invention relates generally to display devices and is particularly applicable for purposes of merchandising wares in show cases, show windows, stores and the like and to serve window dressers of show cases, stores, show windows and the like, in arranging goods for display so as to vary the position and arrangement of the goods displayed, in accordance with the periodic customary changes made, conducive to best business practice.

In show window dressing and with the customary and periodic changes that are made in the display of merchandise in store windows, show cases and the like, it becomes necessary in order to display the goods to the best advantage that frequent changes be made in the goods on display and accordingly in the arrangement of the fixtures in order to accommodate them for the variety of articles on display at such changes. Windows dressed on one occasion with one class of merchandise are not readily adaptable for the display of goods of an entirely different nature or for an entirely different layout. It thus becomes necessary for merchants to have a large variety of display fixtures on hand so as to cope with the frequent changes that are made.

This invention has for its object generally the provision of a display device which is capable of displaying to best advantage merchandise customarily positioned in show cases, show windows, stores and the like, and further resides in the provision of a display device so as to present the maximum display area, and at the same time so display the merchandise as to give it maximum attractiveness and appeal in regard to the particular nature of the goods on display.

This invention has for its object the provision of a display device which is universal in character and which is capable of serving the various and frequent needs of show window dressers so as to be adapted for displaying various kinds of merchandise and various changes of display.

A further object of my invention resides in the provision of a display device which is readily and quickly adjustable so as to be capable by slight modification or manipulation to adapt itself for the ready needs of window dressers in making their frequent changes of the merchandise in display windows, show cases and the like, with the same fixtures used.

A still further object of my invention resides in the provision of a display device which is adjustable as to the quantity of display surface that is to be presented.

A still further object of my invention resides in the provision of a display stand which is adjustable as to the quantity of display surface that is to be presented and the angular position thereof.

A still further object of my invention resides in the provision of a display device in which shelves are longitudinally adjustable in relation to each other, and further one in which the display shelves are longitudinally and angularly adjustable in relation to each other: still further, one in which the shelves are longitudinally and angularly adjustable to each other and varying as to the quantity of display area exposed; further, one in which there is a plurality of shelves of constantly varying angular position relative to each other.

A further object of my invention resides in the provision of display units or stands which are highly stable in an upright position; the provision of a display device and combination therewith of shelves angularly positioned therewith, having means thereon arranged to maintain goods placed on shelves for display no matter what angular position is given to the display shelves.

A still further object of my invention resides in the provision of display standards or supports and display shelves associated therewith so that the shelves may be changed and adjusted in relation to the standard or supports quickly and efficiently and independent of each other and still retain the necessary strength and rigidity to serve their purposes, and without disturbance of existing display arrangements and which may be increased or decreased in capacity at will.

A still further object of my invention resides in the provision of display fixtures so as to be capable of adjustment and variation as to quantity and quality of display without modification of the inherent structure of the arrangement that is used and having the individual elements thereof interchangeable.

To attain these objects and such further objects as may appear or be hereinafter pointed out, I make reference to the accompanying drawing, in which—

Figures 1, 2, 3, 4, 5:
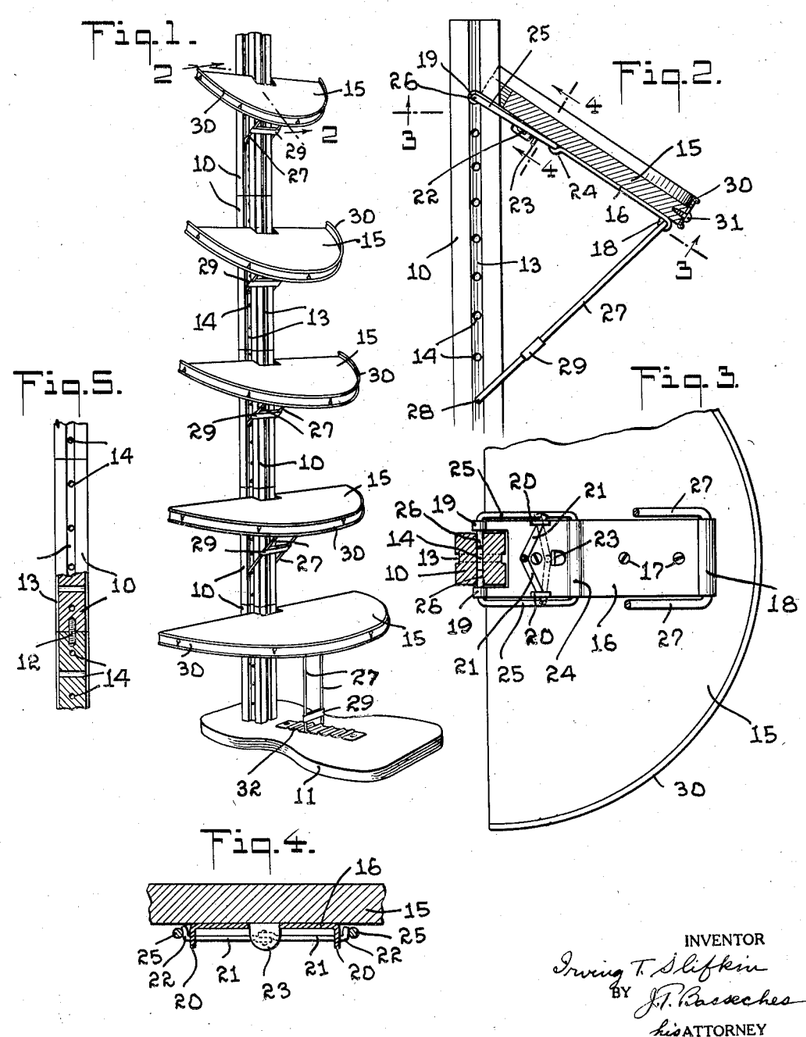
Fig. 1 is a perspective view of a display stand partially broken away at one point.
Fig. 2 is a partial side elevation taken on a line 2—2 of Fig. 1.
Fig. 3 is a section taken on a line 3—3 of Fig. 2.
Fig. 4 is a section taken on a line 4—4 of Fig. 2.
Fig. 5 is a partial sectional view of the standard.

As shown in the drawings my improved display device comprises a standard 10 which is preferably supported upon a base 11. This standard may be of any desired form but is preferably constructed as illustrated and comprises a plurality of complemental sections which in the preferred form are substantially square in cross sectional area. Opposed ends of these sections are held securely together by a screw threaded member 12 partially embedded in one section, the adjacent section being threaded upon the exposed end of the member 12, as shown in Fig. 5. The exterior faces of each section are grooved as indicated at 13, there being a plurality of apertures 14 arranged in intersecting relationship, and extending completely through the standard thus joining opposed grooves for a purpose to be hereinafter more fully described.

A plurality of shelves 15, the rear face of each having a centrally located recess for the reception of the standard, are provided. These shelves, upon which the goods or merchandise to be displayed are placed, may be of any desired ornamental exterior form and finish. As stated above these shelves when properly positioned upon the standard 10 partially surround the same; there being provided just sufficient clearance to allow the relative angular and longitudinal adjustment.

A shelf supporting member 16 is rigidly secured to the bottom face of each shelf by any desired means as by screws or the like 17. The front end of each shelf supporting member is provided with an integral turned down eye 18, the opposite end thereof being recessed to embrace the standard thus providing relatively short opposed arms on the shelf supporting member, each of these arms terminating in an integral eye or lug 19. It will be noted that, as shown in Fig. 3, when the shelf is properly positioned with respect to the standard the eyes 19 of the shelf supporting member will be in direct alignment with the apertures in the standard.

In the form shown in Figs. 3 and 4 the shelf supporting member is further provided with a pair of integral opposed ears 20 through which are guided links 21 having their extremities turned inwardly as at 22; the adjacent ends of these links being offset and pivotally connected so as to form a toggle. A centrally located ear 23 is struck up from the shelf supporting member at a point directly in front of the ears 20 to act as a stop for the toggle when in open position, and hold the toggle from passing beyond the dead center for a material distance.

At a point adjacent the center thereof each shelf supporting member 16 is formed with a downwardly depressed portion or bearing 24 providing a bearing for a substantially U-shaped standard engaging or shelf holding member. This shelf holding member comprises a pair of opposed resilient arms 25 the extremities of which are turned inwardly as at 26 and are adapted to pass through the eyes 19 of the shelf supporting member and thence extend into any desired aperture in the standard. The extremities 22 of the toggle 21 engage the resilient arms 25 of the standard engaging member; thus when the toggle is in the position indicated in dotted lines in Fig. 3, against the stop 23, the resilient arms 25 will be forced outwardly thus providing clearance and thereby assisting in their disengagement from the aperture in the standard when it is desired to vary the position of the shelf.

Pivotally mounted within the eye 18 at the front end of the shelf supporting member is a brace comprising opposed resilient arms 27 the extremities of which are turned inwardly as at 28 and are adapted to engage a desired aperture 14 in the standard. A substantially rectangular sleeve or strap 29 is slidably mounted on the arms 27 and when moved into position adjacent the standard the said strap will act as a locking member preventing the brace from becoming disengaged from the standard. It will thus be seen that upon the standard engaging arms 25 having been positioned in the proper aperture in the standard the angular relationship between standard and shelf may be varied at will by changing the aperture with which the extremities of the brace are engaged.

Where my display element is in the form of a shelf it may be provided with an adjustable rim 30 secured to the shelf as by screws 31 passing through vertical slots in the rim, for the retention of the articles or merchandise displayed. This rim may be adjusted to protrude to various extent beyond the shelf or lie flush with same when used in a horizontal position.

Where used as a stand as in the construction illustrated in Fig. 1, the lowermost shelf may be supported in any desired adjusted position by having the extremities of the brace 27 engaging a desired corrugation in a serrated, waved, or fluted element 32 secured to the base 10 as by screws or the like; or the serrations may be an integral part of the base. In this instance as above the brace is held securely locked in the desired position by adjustment of the sleeve 29 as above described. In this way not only is added adjustability obtained but greater stability of the stand.

In the construction above set forth where a plurality of shelves are employed in combination with a standard and where it is desired to present a maximum area of display surface to the observer, the first or lowermost shelf is adjusted at an angular plane substantially perpendicular to the standard. The shelf holding member of the second shelf is then engaged with the standard at the desired height above the first shelf and the desired angular relationship between second shelf and standard is attained by engagement of the brace 27 with an aperture some relatively slight distance below the aperture selected in determining the height of the shelf.

In like manner the adjustment of the third, fourth, fifth, and other shelves is accomplished, the distance between the apertures selected for the positioning of the shelf supporting members 25 and the apertures with which the braces 27 are engaged constantly increasing. It will be readily understood that in this manner the angular relationship between each shelf and the standard is constantly increased, thus rendering a greater area of each shelf and consequently a greater portion of the goods or merchandise to be displayed thereon, visible.

The provision of grooves and proper apertures on all sides of the standard permits of the mounting of shelves on a single standard so that the shelves may face different directions. That is if we presume the base or lowermost shelf of the device to extend from the standard in a vertical direction, shelves may be secured upon the standard in an oppositely vertical direction and in both horizontal directions, until in fact a completely surrounding relationship between shelves and standard may be had.

Figure 6:
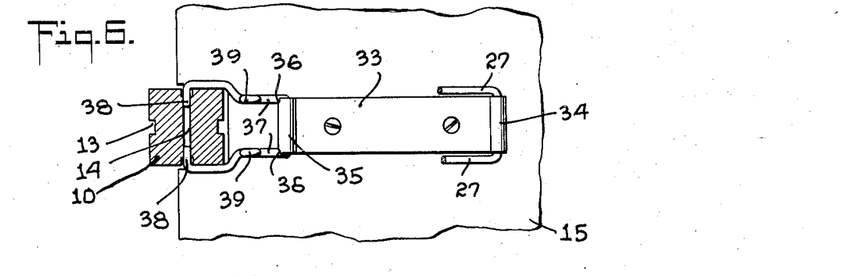
Fig. 6 is a modified form of device taken from a position similar to that in Fig. 3.
Figure 7:
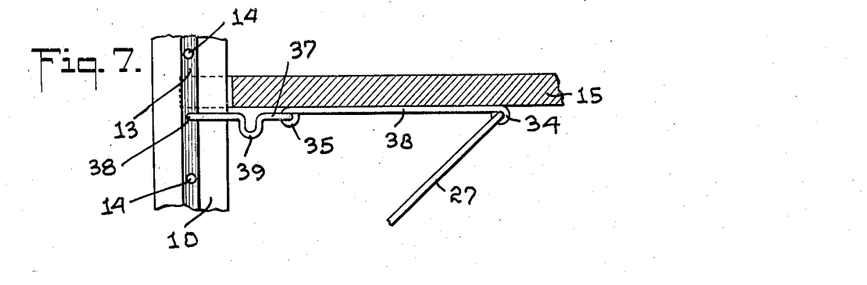
Fig. 7 is a side elevation of the form shown in Fig. 6 and taken on a line similar to 2—2 of Fig. 1.

In the construction shown in Figs. 6 and 7 the shelf 15 has rigidly secured as by screws or the like a shelf supporting member 33 terminating in integral eyes 34 and 35 at its front and rear ends respectively. Pivotally engaged with the eye 34 is the shelf supporting brace comprising the opposed resilient arms 27 as above described. The eye 35 is notched as at 36 to engage the opposed resilient arms 37 of the standard engaging or shelf holding member. These arms 37 are offset to permit of engagement with the standard 10 and have their extremities 38 turned inwardly for engagement with any desired aperture in the standard. The resilient arms 37 may further be provided with downwardly depending U-shaped portions or finger engaging elements 39 thereby providing a ready and convenient handle or means of access when it is desired to disengage the shelf holding member by springing outwardly the arms 37. Obviously the mounting and the angular variation of the shelf with respect to the standard are identically as above described.

Figure 8:
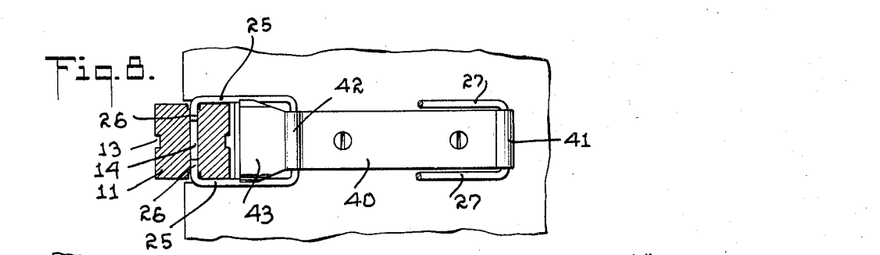
Fig. 8 is a still further modification taken in a direction similar to that shown in Fig. 3.
Figure 9:
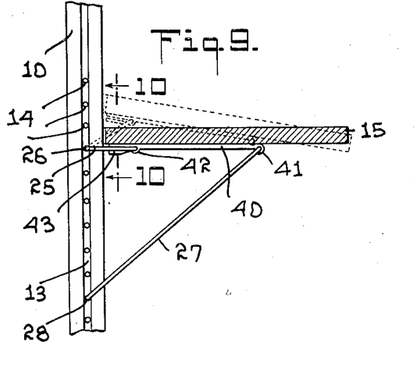
Fig. 9 is a partial side elevation of the modified form shown in Fig. 7 and taken in a direction similar to the view shown in Fig. 2.
Figure 10:
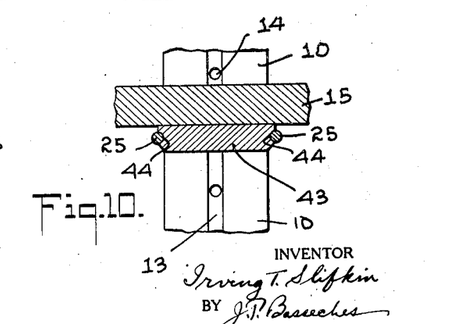
Fig. 10 is a section taken on a line 10—10 of Fig. 9.

In the construction shown in Figs. 8, 9, and 10 the shelf supporting member 40, having integral eyes 41 and 42, is provided with means serving to hold the standard engaging means in rigid aligned position therewith of a rearwardly projecting portion 43, the sides thereof being preferably tapered as shown in Fig. 8. The extremities of these sides are beveled and have a notch 44 formed therein for receiving the opposed resilient arms of the standard engaging member 25, which is pivotally mounted in the eye 42, and securely seating the same. Pivotally mounted within the eye 42 is the brace 27 which needs no further description here.

In practice the shelf holding member is disengaged from the extension 43 of the shelf supporting member. This permits a forward tilting of the shelf to an extent so as to provide clearance for the movement necessary to position the shelf along the length of the standard, see dotted lines in Fig. 9. The extremities 26 of the resilient arms 25 are then properly positioned within a desired aperture in the standard. Pressure is then brought to bear upon the upper surface of the shelf and the beveled surfaces of the extension 43 come into contact with the opposed resilient arms, slightly expanding the said arms, which thus slide over the beveled surfaces and seat within the recesses 44 by a snapping action.

Figure 11:
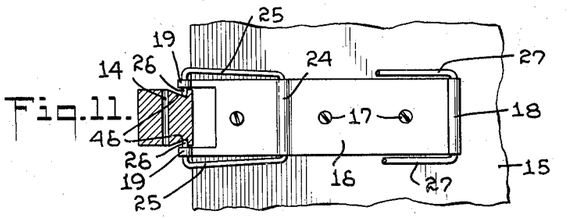
Fig. 11 is a sectional view taken in a direction similar to that shown in Fig. 3 with a modified form of standard and the shelf being shown in position ready for adjustment.
Figure 12:
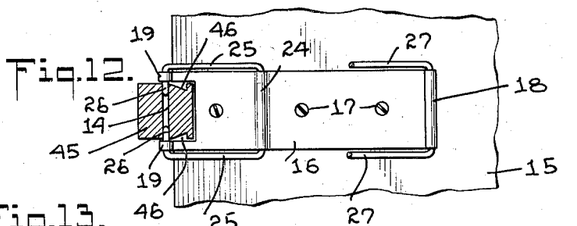
Fig. 12 is a view of structure similar to Fig. 10, with the shelf engaging the standard in a fixed position.

To obtain clearance space between the standard or supporting member and the display supporting member and shelf, I may use a standard of the form shown in Figs. 11 and 12. In this form the standard 45 has the supporting groove disposed from the plane passing through the apertures and is in the form of a tapered groove 46 presenting a beveled surface leading toward the apertures in the standard.

In these figures the construction of the shelf 15, shelf supporting member 16, standard engaging member 25, and brace 27 are identical with similar members shown in Fig. 3.

In mounting the shelf upon the standard the extremities 26 of the shelf holding member are passed through the eyes 19 of the shelf supporting member and are then brought to bear upon the tapered groove 46, see Fig. 11. In this position ready movement along the length of the standard is permitted. The shelf is then pressed in a direction toward the standard and the inturned extremities of the resilient arms 25 are spread apart as they slide up the beveled surface presented by the groove until the extremities engage with the proper aperture in the standard.

Figure 13:
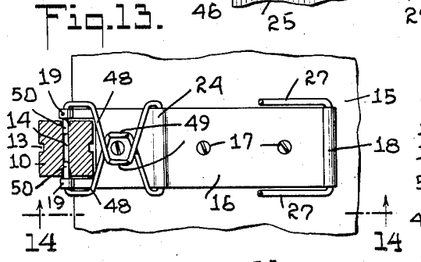
Fig. 13 is a still further modification taken in a direction similar to Fig. 3.
Figure 14:
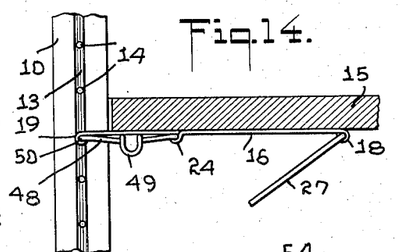
Fig. 14 is a side elevation of Fig. 13 taken on a line 14—14 of Fig. 12.

In the further modification illustrated in Figs. 13 and 14 the shelf supporting members 16 and brace 27 are also identically as above described. In this embodiment of the invention the shelf holding member, pivotally secured in the depressed portion 24 of the shelf supporting member comprises crossed arms 47 having an offset portion at their point of intersection. An integral downwardly depending U-shaped finger engaging portion 49 is provided at these offsets.

This construction is in the nature of a pair of tongs and obviously compression of the portions or handles 49 toward each other will result in the diverging of the aperture engaging ends of the resilient arms 48 thus providing clearance and permitting of disengagement of the shelf holding member and the standard.

Figure 15:
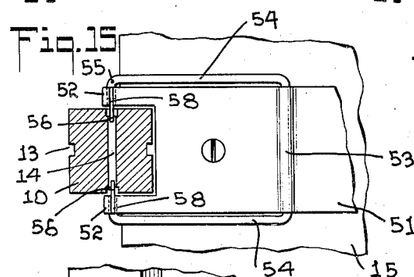
Figs. 15 and 16 are views similar to Figs. 2 and 3 of a still further modification.
Figure 16:
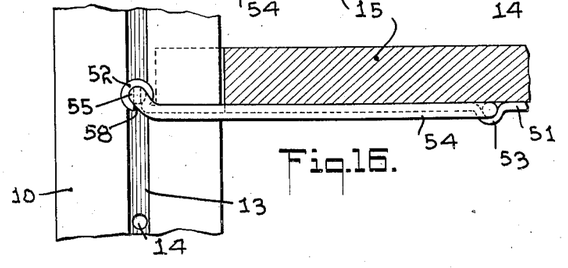
Figure 17:
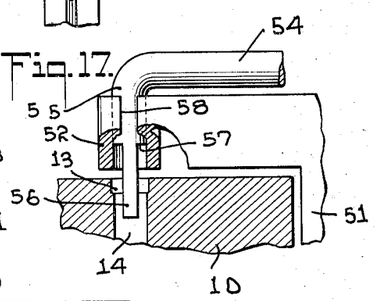
Fig. 17 is an enlarged broken section of the form shown in Fig. 15.

In the further modifications illustrated in Figs. 15, 16, and 17 the shelf supporting member 51 has integral upwardly turned eyes or lugs 52 at its recessed rear end. These lugs are turned upwardly to a point or plane slightly above the bottom of the shelf. Pivotally mounted within a depression 53 of the shelf supporting member is the standard engaging member comprising the opposed resilient arms 54 having their extremities turned upwardly and inwardly as at 55, thus passing through the eyes 52 and into an aperture in the standard. The extended portions 55 are flattened at the extreme ends as shown at 56 with shoulders 57 for a purpose which will be later described.

The ears 52 are not completely closed and are formed with an open portion or slot 58 at the lower side thereof of a width to receive the flat portion 56 and permit of its reception within the ear 52.

To permit of clearance during adjustment of the display elements in a manner similar to the form shown in Figs. 8, 9, and 10, the arms 54 are separated until the shoulders 57 of the members 55 have just cleared the side of the ear 52 and have cleared the aperture 14 to reach the bottom of the groove 13. Forward tilting of the body member 51 is then permitted by reason of the disengagement of the arms 54 from the ears 51. In this way clearance necessary for longitudinal adjustment of the shelves or display elements is afforded. Once a desired position is obtained the shelf or display element and the body member 51 are brought in aligned position with the arms 54 to bear thereon, the flattened portions 56 passing through the slots 58 and are received in the eyelets or ears 52. In this position the extremity 55 and flat portion 56 when aligned with an aperture 14 will plunge in the same. The arm 53 and body member 51 being then held in rigid aligned position by reason of the enlarged portion of the portion 55 entering into the ear 52 of similar contour, and held therein against displacement.

Figure 18:
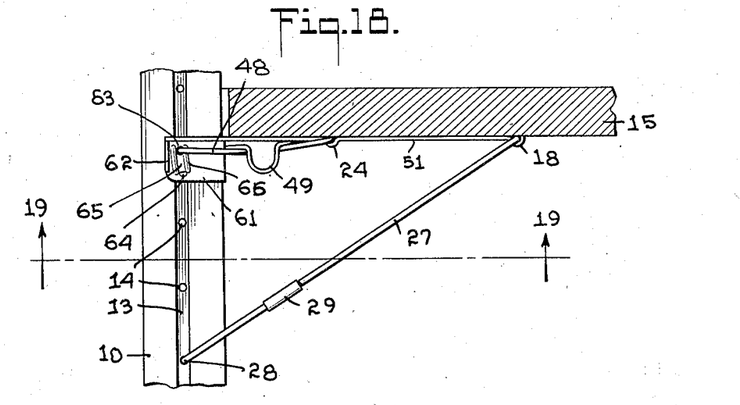
Fig. 18 is a side elevation of a still further modification.
Figure 19:
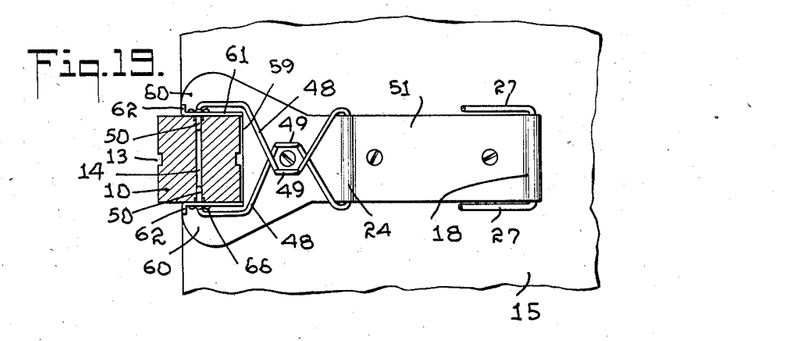
Fig. 19 is a view taken on a line 19—19 of Fig. 18.

In Figs. 18 and 19 I carry out still further the features embodied above, but also in connection with the general structural features still further modify the same by these additional features.

The shelf supporting member 51 is provided at its front portion with an eye 18 and arranged to embrace the standard at the rear end by being recessed at 59 to form the embracing arms 60—60. In my preferred form the body member is made of sheet metal and the arms 60 have an extended downwardly directed integral portion 61 and stiffening member 62 braced against such arms 60. There is also provided the depression or bearing portion 24 for holding the standard engaging member, which is preferably of the pinch-tong variety described in connection with Fig. 13 at 48. To hold the engaging pins 50 and the arms 48 in rigid aligned position with the body member 51, apertures 63 are provided through which the pins 50 pass for engagement with the apertures 14 of the standard. These pins may be entirely removed and may be made to rest upon the extended members 61 when not in operative position.

So positioned, the apertures 63 are uncovered, facilitating the alignment of the same with the apertures 14 of the standard during adjustment from one position to any other.

To prevent displacement from the position on the extended portions 61 of the arms 48, I provide an abutting member 64 struck up in the metal at the lower end of a guide groove 65 formed by embossings 66. This guide groove 65 assures the pins 50 reaching the aperture 63 with great degree of certainty. It will also be observed that the depending arms 61 may be made to snugly embrace the standard 10 and sufficiently extended to prevent lateral tilting of the display device mounted on the body member, in reference to the standard.

Figure 20:
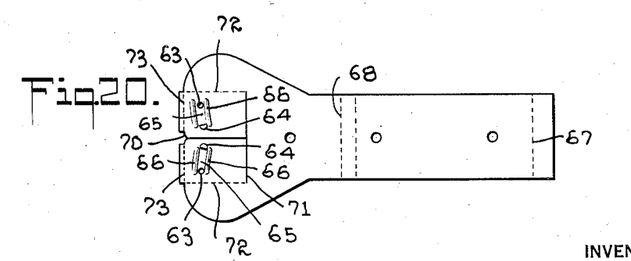
Fig. 20 is a development of the shelf supporting member shown in Fig. 19.

In Fig. 20 I have shown a development in sheet metal of the display element supporting member, designed for the modification shown in Figs. 18 and 19. The parts are similarly identified by like reference characters, the lines 67, 68 form the lines of fold or bend for the bearing members 18 and 24 respectively.

To form the embracing arms 60, a cut is made along the XT-shaped lines 70 and 71 and folded along the lines of fold to form the downwardly depending members 61 and stiffening elements 62. In this way it will be observed that I have provided a simple metal stamping of efficient construction at the same time inexpensive to manufacture.

From the above it will be observed that I have provided a display device capable of particular and efficient use for a window dresser for display purposes of show windows, show cases, and the like which may be modified for the frequent needs, quickly and efficiently. The several elements are interchangeable so that additions may be made with radical modification of any of the parts.

Though most of the material used is preferably metal, these may be modified for certain purposes by combination with glass, wood, etc. as desired. Though I have described my device in the form of a stand supported by a base it will be understood that I contemplate using the supports as members of the walls of store windows to which they may be attached.

Having thus described my invention, I claim:

1. In a display device, a display holder supporting member adapted to engage a display standard comprising a body portion having at one end thereof a pair of resiliently compressed arms for engaging the standard and having means to support the body in predetermined angular adjustable position.

2. In a display device, a display holder supporting member adapted to engage a display standard comprising a body member, a pair of relatively pivotal movable arms for engaging the standard, guiding means for said arms to hold the arms against turning displacement from the body member and means adapted to support the body in predetermined angular position.

3. In a display device, a display holder supporting member adapted to engage a display standard, comprising a body member made of sheet metal shaped to hold a pair of relatively pivotal movable arms for engaging the standard, said body portion having lugs at one end serving as guiding means for said arms to hold the same against turning displacement from the body member, said body member having the other end thereof formed into a lug forming a bearing portion for a brace member.

4. In a display device, a display shelf supporting member, adapted to engage a display support and having one end formed to embrace the support, a pair of resilient arms fixed in said supporting member having engaging pins at their free ends and bearing members for said pins to hold said arms in rigid aligned position with said supporting member but permit separation from each other.

5. In a display device, a display shelf supporting member adapted to engage a display support and having one end formed to embrace the support, a pair of resilient arms pivotally mounted in said supporting member having engaging pins at their free ends and bearing members for said pins to hold said arms in rigid alignment with said supporting member but permitting separation from each other.

6. In a display device, in combination, display shelves and supporting members therefor, a standard having a series of shelf engaging portions arranged along the length of the standard, said shelf supporting members being adapted to engage the standard and having one end formed to embrace the support, a pair of resilient arms pivotally mounted in said supporting member having engaging pins at their free ends and bearing members for said pins to hold said arms in rigid aligned position with said supporting member but permitting separation from each other, said pins being adapted to engage any of the shelf engaging portions for positioning at any position along the length of the standard, by separation of the resilient arms.

and a brace member at the other end of the supporting member for holding the supporting member and display shelf in predetermined angular positions.

7. In a display device, in combination, display shelves and supporting members therefor, a standard having a series of shelf engaging portions arranged along the length of the standard, said shelf supporting members being adapted to engage the standard and having one end formed to embrace the support, a pair of resilient arms fixed in said supporting member having engaging pins at their free ends and bearing members for said pins to hold said arms in rigid aligned position with said supporting member but permitting separation from each other, said pins adapted to engage any of the shelf engaging portions for positioning at any position along the length of the standard, by separating of the resilient arms, and a brace member at the other end of the supporting member arranged to engage any of the series of shelf engaging portions for holding the supporting member and display shelf in predetermined adjustable angular positions.

8. In a display device, in combination, display shelves and supporting members therefor, a standard having a series of shelf engaging portions arranged along the length of the standard, said shelf suporting members being adapted to engage the standard and having one end formed to embrace the support, a pair of resilient arms fixed in said supporting member having engaging pins at their free ends and bearing members for said pins to hold said arms in rigid alignment with said supporting member but permitting separation from each other, said pins adapted to engage any of the shelf engaging portions for positioning at any position along the length of the standard, by separating of the resilient arms, and a brace member comprising a pair of resilient arms at the other end of the supporting member for holding the supporting member and display shelf in predetermined angular positions and a binding strap to hold said last named arms together.

9. In a display device, a display shelf holder adapted to engage a display standard comprising a body portion having at one end thereof a pair of resiliently compressed arms for engaging the standard, engaging pins at the free ends of the arms and lever operated means to move said arms out of engagement with the standard.

10. In a display device, a display shelf holder, arranged to engage a display standard comprising a body portion having at one end thereof, a pair of resilient arms for engaging the standard, having engaging pins thereon, finger engaging portions on said arms offset to overlap each for moving the engaging portions of the arms to and from each other by movement of the finger portions towards each other, said body portion being extended to form bearing portions for said engaging pins to hold said arms in rigid aligned position with said body portion.

11. In a display device, a display shelf holder adapted for lateral engagement with a display standard comprising a body portion formed of sheet metal, a pair of resilient arms having the free ends formed with engaging pins, said body portion having a channel formed to serve as a seat for the resilient arms and downwardly extending portions perforated to receive said pins to hold said arms in rigid alignment with said body portion, said extending portions adapted to embrace the standard to prevent lateral tilting of the body member and shelf thereon and having embossed thereon guiding grooves for said pins in the direction of the perforated portions, and a brace member to hold said body member and shelf in predetermined angular positions.

12. A display device, comprising in combination a standard having a series of display shelf engaging portions, adapted to support a plurality of angularly adjustable display shelves, a base for supporting said standard in upright position, shelves adapted to be supported and braced on said standard to hold the same in various angular positions, and a series of engaging portions on said base adapted to receive a brace member on said shelf, to angularly position the shelf and increase the stability of the device.

13. A display device, in combination, a supporting standard, a display shelf supporting member adapted to embrace said standard, standard engaging members on said supporting members arranged for relatively pivotal movement to each other for positioning the same in any predetermined longtudinal position along the length of the standard and angularly to the supporting member to afford clearance during such positioning movement.

14. In a display device, a display shelf holder comprising a body portion formed of sheet metal, a pair of resilient arms having the free ends formed with engaging pins, said body portion having a channel formed to serve as a seat for the resilient arms and laterally extending portions forming the standard embracing members, said portions being perforated to receive said pins to hold said arms in rigid alignment with said body portion, said extending portions adapted to embrace the standard to prevent lateral tilting of the body member and shelf thereon, and serving to hold said pins out of engagement and a brace member at the other end of the body portion to hold the same in predetermined adjustable angular positions with said standard.

15. In a display device, a display shelf holder comprising a body portion formed of sheet metal, a pair of resilient arms having the free ends formed with engaging pins, said body portion having a channel formed to serve as a seat for the resilient arms and laterally extending portions forming the standard embracing members, said portions being perforated to receive said pins to hold said arms in rigid alignment with said body portion, said extending portions adapted to embrace the standard to prevent lateral tilting of the body member and shelf thereon, and serving to hold said pins out of engagement and a brace member at the other end of the body portion to hold the same in predetermined adjustable angular positions with said standard, said laterally extending portions including a stop member formed thereon to limit the pivotal movement of said arms when said pins are withdrawn from the perforations.

In witness whereof, I have signed and sealed this specification, this 20 day of February, 1925.

IRVING T. SLIFKIN.